US009782731B2

(12) United States Patent
Liezers et al.

(10) Patent No.: US 9,782,731 B2
(45) Date of Patent: Oct. 10, 2017

(54) SYSTEM AND PROCESS FOR DISSOLUTION OF SOLIDS

(71) Applicants: Martin Liezers, Richland, WA (US); Orville T. Farmer, III, Kennewick, WA (US)

(72) Inventors: Martin Liezers, Richland, WA (US); Orville T. Farmer, III, Kennewick, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 244 days.

(21) Appl. No.: 14/292,164

(22) Filed: May 30, 2014

(65) Prior Publication Data

US 2015/0343411 A1 Dec. 3, 2015

(51) Int. Cl.

| | |
|---|---|
| ***B01F 1/00*** | (2006.01) |
| ***H01J 49/14*** | (2006.01) |
| ***H01J 49/26*** | (2006.01) |
| ***G01N 1/44*** | (2006.01) |
| ***H05H 1/34*** | (2006.01) |

(52) U.S. Cl.

CPC .......... *B01F 1/0038* (2013.01); *B01F 1/0005* (2013.01); *H05H 1/34* (2013.01); *H05H 2240/10* (2013.01)

(58) Field of Classification Search

CPC .... B01F 1/0005; H05H 1/34; H05H 2240/10; B01J 19/088; B01J 2219/0894

See application file for complete search history.

(56) References Cited

U.S. PATENT DOCUMENTS

| | | | | |
|---|---|---|---|---|
| 3,794,470 A * | 2/1974 | Meyer | C01G 56/004 422/159 |
| 4,226,369 A * | 10/1980 | Botts | B01D 49/00 219/121.84 |
| 4,289,952 A * | 9/1981 | Haggerty | B22F 1/0085 148/513 |
| 4,434,137 A | 2/1984 | Stoll et al. | |
| 4,703,803 A | 11/1987 | Blumer | |
| 4,747,975 A | 5/1988 | Ritter | |

(Continued)

FOREIGN PATENT DOCUMENTS

| | | |
|---|---|---|
| DE | 19525159 A1 * | 1/1997 |
| EP | 2610009 A1 | 7/2013 |

(Continued)

OTHER PUBLICATIONS

ICP-MS: Inductively Coupled Plasma Mass Spectrometry by Agilent Technologies, Dec. 2005.*

(Continued)

*Primary Examiner* — Geoffrey S Evans

(74) *Attorney, Agent, or Firm* — James D. Matheson

(57) ABSTRACT

A system and process are disclosed for dissolution of solids and "difficult-to-dissolve" solids. A solid sample may be ablated in an ablation device to generate nanoscale particles. Nanoparticles may then swept into a coupled plasma device operating at atmospheric pressure where the solid nanoparticles are atomized. The plasma exhaust may be delivered directly into an aqueous fluid to form a solution containing the atomized and dissolved solids. The composition of the resulting solution reflects the composition of the original solid sample.

14 Claims, 2 Drawing Sheets

(56) References Cited

U.S. PATENT DOCUMENTS

| | | | | | |
|---|---|---|---|---|---|
| 5,745,835 | A * | 4/1998 | Mouliney | B01F 1/0038 | 205/44 |
| 5,769,536 | A * | 6/1998 | Kotylak | B01F 1/0022 | 366/136 |
| 6,065,860 | A | 5/2000 | Fuchsbichler | | |
| 6,433,464 | B2 | 8/2002 | Jones | | |
| 8,470,344 | B2 | 6/2013 | Bershteyn et al. | | |
| 2005/0039780 | A1* | 2/2005 | McCurdy | B01F 1/0005 | 134/42 |
| 2005/0258149 | A1* | 11/2005 | Glukhoy | H05H 1/34 | 219/121.48 |
| 2005/0287308 | A1* | 12/2005 | Becker | B82Y 30/00 | 427/561 |
| 2006/0049547 | A1* | 3/2006 | Khang | B82Y 30/00 | 264/400 |
| 2007/0046934 | A1 | 3/2007 | Roy | | |
| 2007/0080054 | A1* | 4/2007 | Parkansky | B01J 8/005 | 204/164 |
| 2007/0104892 | A1* | 5/2007 | Ishida | B82Y 30/00 | 427/577 |
| 2007/0134278 | A1 | 6/2007 | Bershteyn et al. | | |
| 2009/0073586 | A1* | 3/2009 | Fry | G01N 21/71 | 359/839 |
| 2009/0247447 | A1* | 10/2009 | Tamura | H01L 21/02071 | 510/175 |
| 2010/0209700 | A1* | 8/2010 | Liu | C23C 14/086 | 428/323 |
| 2011/0168640 | A1* | 7/2011 | Gilmour | B01F 3/04503 | 210/703 |
| 2012/0099103 | A1* | 4/2012 | Hahn | G01N 21/718 | 356/316 |
| 2012/0148756 | A1* | 6/2012 | Liu | C23C 14/086 | 427/535 |
| 2012/0211477 | A1* | 8/2012 | Chacin | B23K 26/0853 | 219/121.69 |
| 2012/0282134 | A1* | 11/2012 | Liu | B01J 13/0043 | 420/591 |
| 2014/0070085 | A1* | 3/2014 | Molloy | H01J 49/105 | 250/282 |
| 2014/0268134 | A1* | 9/2014 | O'Connor | H05H 1/30 | 356/318 |
| 2014/0319712 | A1* | 10/2014 | Shimizu | B01J 19/088 | 264/10 |
| 2014/0322138 | A1* | 10/2014 | Ichikawa | B01J 13/0043 | 424/9.4 |
| 2015/0348768 | A1* | 12/2015 | Lee | H01J 49/0422 | 250/282 |

FOREIGN PATENT DOCUMENTS

| | | | |
|---|---|---|---|
| JP | 2009-110853 | A * | 5/2009 |
| WO | WO-2014/104749 | A1 * | 7/2014 |
| WO | WO-2014/152898 | A2 * | 9/2014 |

OTHER PUBLICATIONS

Takasaki et al., "Measurement of the isotopic abundance of boron-10 by inductively coupled plasma-quadropole mass spectrometry", Aug. 2012, Journal of Nuclear Science and Technology, vol. 49, No. 8, pp. 867-872.*

"Using Laser Ablation with XSERIES 2 ICP-MS for Quantitative Analysis of Nickel Alloys", Thermo Fischer Scientific, Dec. 2008.*

Tanaka, T., et al., Collection of laser-sampled particles in solutions followed by ICP-MS for the analysis of sintered silicon nitride, Bunseki Kagaku, vol. 49, No. 1, 2000, 11-14.

Bart, J. C. J., Polymer/additive analysis by flash pyrolysis techniques, Journal of Analytical and Applied Pyrolysis, 58, 59, 2001, 3-28.

Goltz, D. M., et al., Lower Power Spark Ablation for Rapid Dissolution of Metals, J. Anal. At. Spectrom, 17, 2002, 395-399.

* cited by examiner

SYSTEM AND PROCESS FOR DISSOLUTION OF SOLIDS

STATEMENT REGARDING RIGHTS TO INVENTION MADE UNDER FEDERALLY-SPONSORED RESEARCH AND DEVELOPMENT

This invention was made with Government support under Contract DE-AC05-76RL 01830 awarded by the U.S. Department of Energy. The Government has certain rights in the invention.

FIELD OF THE INVENTION

The present invention relates generally to dissolution of solids. More particularly, the present invention is a high-temperature plasma system and process that provide dissolution of solids including difficult-to-dissolve solids.

BACKGROUND OF THE INVENTION

Analyzing solids with unknown compositions can present major analytical challenges. While many analytical techniques can be directly applied to solids, accurate quantification can be problematic if standards that match the matrix of the unknown solids are not available in a range of compositions. When accurate analysis of a solid is required, dissolution of the solid is often a favored preparation approach prior to analysis. However, dissolution of solids is not always easily accomplished. For example, many solids are "difficult-to-dissolve" solids that do not have a solubility in water above about 1% by weight (0.25 Mol/L) without addition of concentrated acids such as sulfuric acid, hydrofluoric acid, perchloric acid, or a combination of acids such as nitric/hydrochloric acids. In some conventional dissolution processes, dissolution of solids may require procedures such as sulfuric acid wet ashing that require concentrated acids, or alkali fusions that require concentrated bases. In other conventional dissolution processes, dissolution of difficult-to-dissolve solids requires multiple chemicals or multiple procedures. And, in yet other conventional dissolution procedures such as high-temperature and/or high-pressure microwave digestion, dissolution of difficult-to-dissolve solids can require extreme process conditions such as high temperatures (e.g., 200° C. to 300° C.) and/or high pressures [e.g., 10 atm (1.0 MPa) to 100 atm (10.1 MPa)] in addition to concentrated acids, concentrated bases, or other hazardous chemicals. Further, determining which chemicals and/or conditions are needed to achieve dissolution can be complex, difficult, or otherwise problematic. In general, difficult-to-dissolve solids require one or more of the following conditions to dissolve the solid in water: i) one or more concentrated acids [e.g., hydrofluoric (HF), hydrochloric (HCl), nitric ($HNO_3$), sulfuric ($H_2SO_4$), chromic ($H_2CrO_4$), phosphoric ($H_3PO_4$); and combinations of concentrated acids] are required at a concentration greater than 1 mol/L; ii) one or more concentrated bases or alkalis [e.g., ammonium hydroxide ($NH_4OH$), potassium hydroxide (KOH), sodium hydroxide (NaOH), other bases, and combinations of these bases] are required at a concentration greater than 1 mol/L; iii) two or more added chemicals in combination are required; iv) one or more fusion procedures such as, e.g., sulfuric acid wet ashing or alkali fusion is required; v) two or more different analytical procedures in combination are required; vi) an organic solvent (e.g., ethanol) at a concentration greater than about 25% by weight is required; vii) a high-temperature greater than or equal to 4000 K is required; and/or viii) a high-pressure between about 20 MPa to about 40 MPa is required such as that used in closed canister microwave digestion. Difficult-to-dissolve solids may include, but are not limited to, e.g., glasses, silicates, carbides (e.g., boron carbide), metal oxides, corrosion-resistant metals (e.g., Zr, Nb, Hf, and Ta), ceramics, cermets, nitrides, ceramic nitrides, soils, clays, concretes, mortars, brick, rock, plastics, and combinations of these various solids. Such solids may also include various forms. For example, solids may be in the form of, e.g., crystalline solids, amorphous solids, polycrystalline solids, powdered solids, molecular solids, covalent solids, and combinations of these various solids. Accordingly, new systems and processes are needed that dissolve solids including difficult-to-dissolve solids without the need of concentrated acids; concentrated bases or alkalis; hazardous chemicals, and/or multiple analytical procedures. The present invention addresses these needs.

SUMMARY OF THE INVENTION

The present invention includes a system and process that provide dissolution of solids and difficult-to-dissolve solids in aqueous fluids without the need for concentrated acids, concentrated bases and alkalis, dissolution agents, substantial quantities of hazardous chemicals or organic solvents, and/or the need for multiple analytical procedures. Aqueous fluids of the present invention contain less than about 2% by weight of any dissolution agent.

The system may include an ablation device that is coupled to a high-temperature plasma device. Ablation devices may include laser ablation devices and spark ablation devices. Laser ablation devices may include an excitation laser that delivers a pulsed laser beam with a selected beam width that ablates a solid sample into small solid particles of a selected size.

In some embodiments, beam width is selected below about 1 microsecond (μsec). In some embodiments, beam width is selected below about 20 nanoseconds (ns).

Quantity of ablated solids ablated in the ablation device depends at least in part on the power of the ablation source and the pulse width of the ablation beam. In some embodiments, ablated solid particles may include a size less than about 10 nm on average.

Ablated particles may be introduced into the high-temperature plasma device. High-temperature plasma devices include, but are not limited to, e.g., inductively coupled plasma devices; microwave devices; AC-arc plasma devices, DC-arc plasma devices, laser plasma devices, laser-induced plasma devices, and combinations of these various devices. The high-temperature plasma device atomizes solid particles received from the ablation device into atoms that are representative of components of the solid particles and thus of the original solid sample. The term "representative" means the composition of the atomized solid particles matches the composition of the original sample solids.

In some embodiments, atomization in the high-temperature plasma device may be performed at a temperature above about 4,000 Kelvin. In some embodiments, atomization may be performed at a temperature between about 5,000 Kelvin and about 10,000 Kelvin.

High-temperature plasma gas containing atoms and/or molecular ions from the atomized solid particles may be delivered directly from the exhaust of the high-temperature plasma device into an aqueous receiving fluid that is free of concentrated acids and bases or other dissolution agents contained within a receiving vessel. The plasma gas containing atoms and/or molecular ions from the atomized solid particles may be delivered in a sweep gas into the receiving fluid for dissolution. Sweep gases may include, but are not limited to, e.g., air, nitrogen ($N_2$), argon (Ar), helium (He), oxygen ($O_2$), carbon dioxide ($CO_2$), and combinations of these various support and carrier gases.

In some embodiments, sweep gas pressures may be selected between about 100 Torr (0.13 atm) and about 760 Torr (1 atm). In some embodiments, sweep gas pressures may be selected greater than or equal to about 0.5 atm (0.05 MPa).

In some embodiments, the high-temperature plasma device may include a water-cooled sampling interface that delivers the plasma gas directly from the exhaust (exit) port of the high-temperature plasma device into the aqueous receiving fluid.

In some embodiments, the vessel containing the aqueous receiving fluid may be coupled to a vacuum pump that removes excess sweep gas from the vessel.

In some embodiments, plasma gas containing atoms and/or molecular ions from the atomized solid particles may be passed through a gas bubbler that is coupled to the receiving vessel containing the receiving fluid. Atoms in the high-temperature plasma then dissolve in the fluid which forms a solution containing the dissolved sample solid. Atomized constituents in the resulting solution reflect the composition of the original solid particles and the solid sample prior to ablation.

Atomized solids are soluble in various receiving fluids. Receiving fluids may include, but are not limited to, e.g., deionized water, or other aqueous fluids that include various additives. The term “additive” refers to any compound or material that is added to the aqueous fluid for purposes other than effecting dissolution of the original solid such as, e.g., to maintain or adjust pH, to provide counter-ion balancing, to provide buffering, to stabilize the resulting solution or to prevent precipitation of dissolved solids over time, and like purposes. Additives may include, but are not limited to, e.g., dilute acids, dilute alkalis, buffers, inorganic salts, counter-ion salts, complexants such as, e.g., oxalic acid; soluble organic solvents such as, e.g., methanol, acetone, normal alcohols including, e.g., ethanol, propanol, butanol, and like alcohols; isopropyl alcohol (IPA); dimethylsulfoxide (DMSO); other organic solvents; combinations of these various solvents; and other additives such as dilute acids and dilute alkalis, including combinations of these additives and fluids.

Quantity of atomized solids that may be transferred into a receiving fluid from the high-temperature plasma may be up to the limit of solubility in the selected fluid. The resulting solution containing dissolved solid particles may be analyzed to characterize the soluble species of the solid components in the solution.

The system may include a transfer device positioned between the ablation device and the high-temperature plasma to transfer solid particles generated in the ablation device into the plasma device. Solid particles may be carried from the ablation device into the high-temperature plasma device in a sweep gas.

In some embodiments, the system may be configured in a field-deployable form to provide dissolution of difficult-to-dissolve solids and other solids obtained in hazardous environments such as the aftermath of a nuclear explosion. The system may form solutions containing the dissolved solids for sample analysis. The present invention minimizes need for hazardous chemicals, operator intervention, operator exposure to hazardous environments, and/or transportation of sample solutions containing hazardous materials.

The process for dissolving a solid or a difficult-to-dissolve solid may include ablating a solid sample with a pulsed excitation beam to convert the sample into small solid particles. Ablated solid particles may be carried in a sweep gas into a high-temperature plasma device. Ablated solid particles may then be atomized in the high-temperature plasma device to form atoms and/or molecular ions representative of the compounds or components in the solid particles and thus of the solid sample. Then, atoms and/or molecular ions obtained from the atomized solids may be delivered in a sweep gas from the plasma device into an aqueous receiving fluid to form a solution containing the atoms and/or molecular ions of the atomized solid particles and thus the dissolved solid. Atom and/or molecular constituents from the atomized sample particles in the solution are substantially identical to, or representative of, the composition of the original solid prior to ablation.

The present invention also allows stable measurements of solutions containing the atomized and dissolved solids. The process may include analyzing the receiving solution containing the atomized and dissolved solid to determine and quantify components in the original solid sample. The process may also include analyzing the receiving solution containing the atomized and dissolved solids to determine the isotopic ratios of constituents present in the original sample solid. Results have been demonstrated using NIST standard glasses and boron carbide that have been analyzed by elemental and isotopic analyses.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION

A system and process are described that provide dissolution of solids including difficult-to-dissolve solids. In the following description, embodiments of the present invention are shown and described by way of illustration of the best mode contemplated for carrying out the invention. It will be clear that the invention is susceptible of various modifications and alternative constructions. Therefore the description should be seen as illustrative and not limiting. The present invention covers all modifications, alternative constructions, and equivalents falling within the spirit and scope of the invention as defined in the claims.

Figure 1:
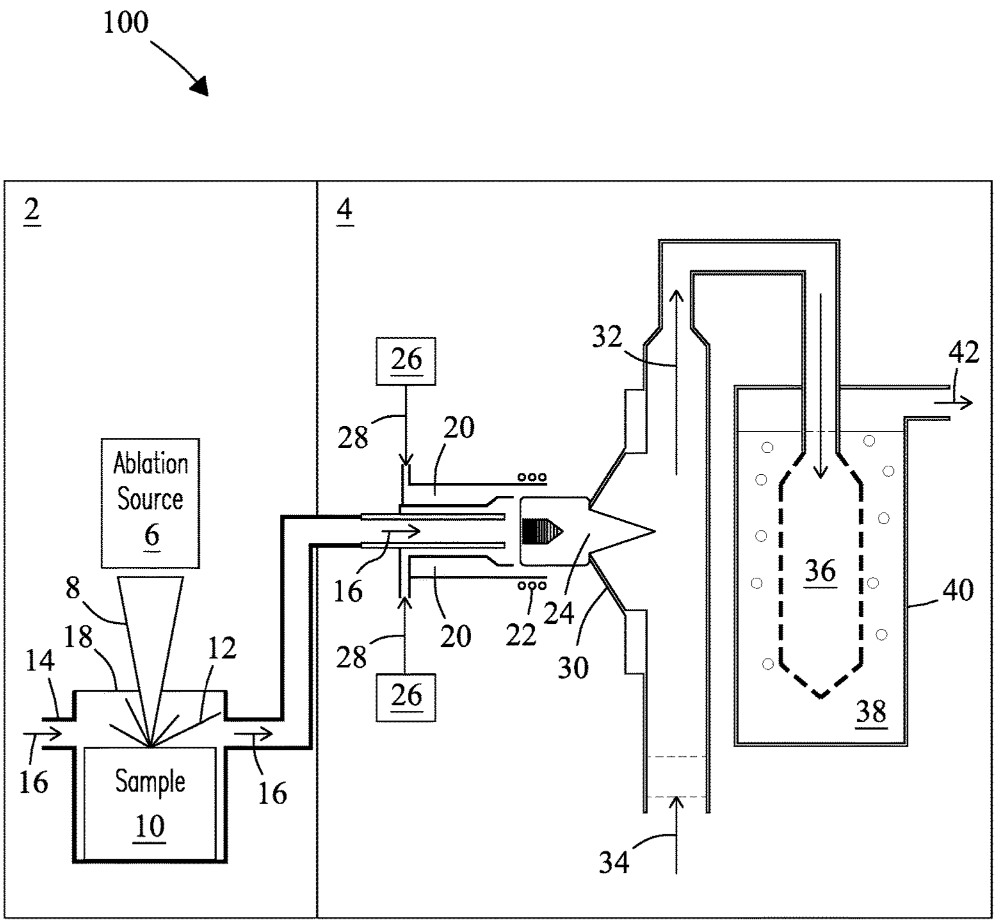
FIG. 1 is a schematic showing an exemplary system of the present invention for dissolution of solids and difficult-to-dissolve solids.

FIG. 1 illustrates an exemplary system 100 of the present invention that provides dissolution of solids and difficult-to-dissolve solids in aqueous fluids without the need of concentrated acids greater than 1 mol/L, concentrated bases or alkalis greater than 1 mol/L, any dissolution agent at a concentration greater than about 2% by weight, hazardous chemicals, organic solvents at concentrations greater than or equal to 10%, and/or without the need for two or more separate analytical procedures. System 100 may include an ablation device 2 such as a laser ablation device 2 that is coupled to a high-temperature (≥4,000 K) plasma device 4. Ablation devices may include: laser ablation devices; and spark ablation devices. In some embodiments, ablation device 2 may by a laser ablation device that include an excitation laser 6 that delivers a pulsed excitation beam 8 that ablates solids 10 and/or "difficult-to-dissolve" solids 10 into particles 12 of a selected size.

In some embodiments, particles may have a size less than or equal to one micrometer (1 μm) on average. In some embodiments, solid particles may include a size less than or equal to about 10 nm on average. In some embodiments, particles may include a size less than or equal to one nanometer (1 nm) on average.

In some embodiments, ablation device 2 may produce a quantity of ablated solids down to about 100 femtogram quantities. In some embodiments, ablation device 2 may produce a quantity of ablated solids up to about milligram quantities.

Ablation device 2 may include a gas port 14 that introduces ablation sweep gas 16 into laser ablation device 2. Ablation sweep gas 16 serves to sweep ablated sample particulates 12 from ablation chamber 18 into high-temperature plasma device 4. High-temperature plasma devices include, but are not limited to, e.g., Inductively Coupled Plasma (ICP) devices; microwave devices; AC-arc plasma devices; DC-arc plasma devices, including combinations of these various plasma devices.

In the exemplary embodiment, high-temperature plasma device 4 may include a plasma torch 20 that provides the high-temperature plasma. Plasma torch 20 may include a plasma generation device 22 such as a plasma coil 22 or another generation device that generates high-temperature plasma 24 delivered by plasma torch 20. Plasma torch 20 may be coupled to a gas source 26 that provides a plasma support gas 28 from which plasma 24 is formed. Plasma support gases include, but are not limited to, e.g., argon (Ar), nitrogen ($N_2$), oxygen ($O_2$), air, other support gases, and combinations of these various support gases. The generated plasma may include gas pressures greater than or equal to about 0.5 atm (≥0.05 MPa). In some embodiments, plasma gas pressures may be at atmospheric pressure (~0.1 MPa). High-temperature plasma 24 atomizes solid particles 12 introduced into high-temperature plasma device 4 and forms charged and neutral atomic species in the plasma gas.

Solid particles may be atomized in the high-temperature plasma 4 at temperatures at or above about 4,000 Kelvin (3727° C.). In some applications, solid particles may be atomized at temperatures between about 4,000 Kelvin and about 10,000 Kelvin. In some applications, solid particles may be atomized at temperatures greater than about 10,000 Kelvin (9727° C.). In some applications, solid particles may be atomized at temperatures between about 4,000 Kelvin (3727° C.) and about 6,000 Kelvin (5727° C.). In some applications, solid particles may be atomized at temperatures up to about 8,000 Kelvin (7726° C.). No limitations are intended.

In some embodiments, high-temperature plasma device 4 may be coupled to a sampling interface 30 such as a water-cooled sampling cone 30 that cools plasma 24 exiting as exhaust gas 32 from high-temperature plasma device 4. Cooled plasma exhaust gas 32 containing atomized sample species may be delivered in an optional sweep gas 34 (e.g., Ar, $N_2$, $O_2$, air, or other gases) through a bubbler 36 such as a glass frit bubbler or a plastic frit bubbler into an aqueous receiving fluid 38 or capture fluid 38 held within a receiving container 40. Receiving fluid 38 dissolves exhaust gas 32 containing the atomized sample species. Plasma exhaust gas 32 may be drawn into the fluid using a slight vacuum generated, e.g., by a vacuum pump 42 or a laboratory or process vacuum system. As described and shown herein, the present invention provides dissolution of solids in solution without the need for concentrated acids, alkalis, or hazardous chemical agents.

Laser Excitation Sources and Operation Parameters

Laser ablation devices may include an excitation source such as a pulsed laser. Pulsed laser sources include, but are not limited to, e.g., Quantum Cascade (QC) lasers, Distributed Feedback (DFB) lasers, Inductively Coupled (IC) lasers, External Cavity (EC) QC lasers, diode lasers, and combinations of these lasers. Pulsed laser irradiation provides explosive heating of the sample which ablates the sample and generates solid particles. Ablation lasers may deliver pulsed ablation beams at selected wavelengths in the spectral region from infra-red to vacuum ultraviolet at a selected or sufficiently high power density that ablates the solid sample into sample particles. Energy required to ablate solid materials depends at least in part on the optical properties of the materials, laser spot size, selected wavelength, and the duration of the pulse width. The ablation threshold for nanosecond laser ablation systems is typically between about 0.01 Joules/$cm^2$ to about 0.05 Joules/$cm^2$. Below this threshold, no ablation particles are produced.

In some embodiments, power density selected for the ablation source that ablates the sample and forms solid particles may be between about 0.05 Joules/$cm^2$ to about 100 Joules/$cm^2$. Preferred power densities are typically selected between about 0.5 Joules/$cm^2$ to about 10 Joules/$cm^2$. However, no limitations are intended.

In some embodiments, laser ablation devices may be configured to ablate a selected localized area or dimension (i.e., a "spot") or a selected quantity [e.g., picogram (pg)] of solid material into particles. Spot sizes may be chosen that selectively ablate specific sites, regions, phases, sub-phases, or even contaminants of a solid material, which allows constituents present in each site, region, or phase of the solid to be characterized. In some embodiments, spot sizes may be less than about 10 μm. In some embodiments, spot sizes may be greater than about 10 μm. In some embodiments, spot sizes may be selected between about 10 μm and about 20 μm. In some embodiments, spot sizes may be greater than about 10 μm. However, spot sizes are not limited. As will be appreciated by those of ordinary skill in the art, quantity of material to be ablated depends in part on the detection sensitivity for the selected contaminant. For example, to collect sufficient solid particles for characterization of a contaminant in the sample material, if the detection sensitivity for the contaminant is at, e.g., one picogram, a microgram quantity of the sample material may need to be ablated. However, no limitations are intended by this example.

Power of the laser depends at least in part on the selected laser beam pulse width. In various embodiments, laser beam pulse widths may be selected in the range from nano-seconds to femto-seconds. For lasers that deliver a laser beam with a femtosecond pulse width, power required to ablate sample solids may be in the microjoule (μJ) power range. For lasers that deliver a laser beam with a nanosecond pulse width, power required to ablate sample solids may be in the millijoule (mJ) power range. The upper limit for pulse widths is typically about 1 μsec. In general, pulse widths may be selected below about 20 nanoseconds (ns). In some embodiments, pulse widths may be selected between about 10 ns and about 20 ns. In some embodiments, pulse widths may be selected between about 5 ns and about 10 ns. In some embodiments, pulse widths may be selected below 10 nano-seconds to minimize fractionation effects for solid samples that contain low-boiling elements that can evaporate from the sample before high-boiling elements begin to vaporize. However, all power levels that ablate sample solids into particles may be used without limitation.

Receiving Fluids

Fluids suitable for use as receiving solutions for dissolution of atomized solids may include, but are not limited to, e.g., deionized water, or other aqueous fluids that include various additives at concentrations at or below about 2% by weight (0.5 mol/L). Additives may include, but are not limited to, e.g., dilute acids; dilute alkalis; buffers; inorganic salts; counter-ion salts; complexants such as, e.g., oxalic acid; soluble organic solvents such as, e.g., methanol, acetone, normal alcohols including, e.g., ethanol, propanol, butanol, and like alcohols; isopropyl alcohol (IPA); dimethylsulfoxide (DMSO); other organic solvents; combinations of these various solvents; and combinations of these various additives and fluids. Complexants typically include a concentration below about 50 ppm. No limitations are intended.

Receiving Containers

Aqueous receiving fluids used in concert with the present invention that receive atomized solids may be carried in inexpensive containers such as, e.g., single use containers and/or disposable containers commonly used for rapid analyses and characterization. Containers suitable for use with the present invention may be constructed of inexpensive plastics or other materials that have a cost currently below $2/unit (U.S.). The present invention thus eliminates need for expensive or robust containers or containment vessels constructed of such materials as polytetrafluoroethylene (PTFE) or perfluoroalkoxyalkane (PFA) polymers designed to resist aggressive chemicals (e.g., heated acids), high temperatures greater than or equal to 100° C., and/or high pressures such as those employed for microwave digestion applications.

Solutions containing dissolved solids prepared by the present invention may be sampled and analyzed to provide sensitive and accurate measurement of constituents in the solids (e.g., isotope ratios) and in the original sample materials. Composition of the solution containing the atomized and dissolved solid constituents reflects the composition of the original solid.

The present invention may also be configured in a field deployable form to provide dissolution of solids and other difficult-to-dissolve solids recovered from hazardous environments such as explosion debris recovered from the aftermath of a nuclear explosion without the need for concentrated dissolution acids and other hazardous chemicals. The system may form solutions containing the dissolved solids, e.g., for rapid radiochemical analysis or other sample analyses that may be performed on-site or off-site. The present invention generates solutions that reflect the original composition of solid samples that minimizes need for: hazardous chemicals, operator intervention, operator exposure to hazardous environments, transportation of sample solutions containing hazardous materials, and/or need to store or dispose of hazardous wastes.

EXAMPLES

The following examples provide a further understanding of various aspects of the present invention.

Example 1

Dissolution and Analysis of Boron Carbide

Figure 2:
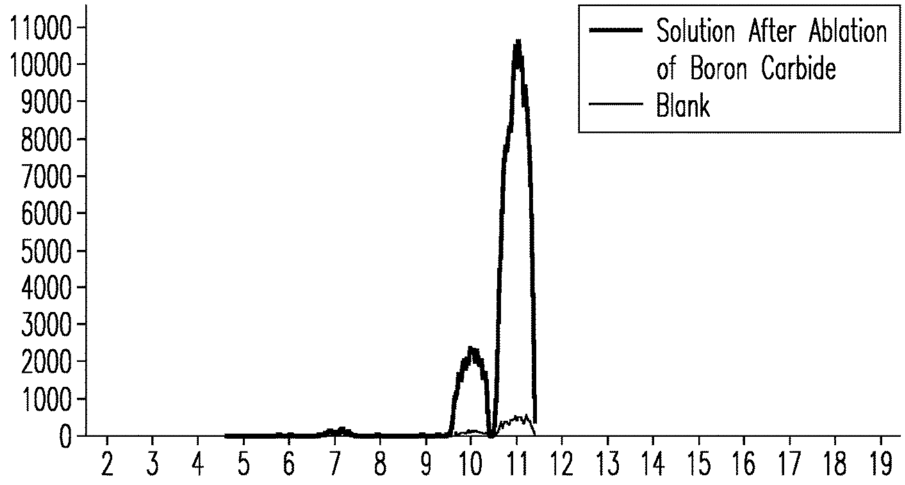
FIG. 2 is a plot showing analytical results for boron carbide, a material representative of difficult-to-dissolve solids dissolved in concert with the present invention.

A ~5 mm (diameter) sample of boron carbide was placed in the laser ablation cell of FIG. 1. The ablation laser was set to raster scan the surface of the boron carbide sample at an energy of 5 Joules/cm$^2$ and a repetition rate of 10 Hz. Laser spot size was 350 μm. Boron carbide particles were swept from the ablation cell during ablation using an argon-air flow at a flow rate of 0.8 L/min into an inductively coupled (argon) plasma operating at an applied RF frequency of 27.12 MHz and a power of 850 Watts. A strong green emission characteristic of the $C_2$ species was visible in the tail flame of the plasma during ablation that disappeared immediately after ablation was completed. Exhaust gas from the plasma was drawn through a glass frit into a volume (~15 mL) of deionized (18.2 MΩ) water. Exhaust gas was delivered into the deionized water volume at a flow rate sufficient to cause vigorous bubbling of the resulting solution, but sufficiently low to prevent the solution from being drawn into the vacuum pump. Approximately 200 μg of boron was ablated based on sample weight difference before and after ablation. After sample ablation was complete, the resulting solution was filtered through a 450 nm pore filter (e.g., Acrodisc 0.45 μm filter, Pall Corp., Port Washington, N.Y., USA) and analyzed by ICP-MS. FIG. 2 shows a mass scan of the boron isotopic region of the solution prepared by the laser ablation-plasma atomization process of the present invention together with a comparison "blank" solution prepared in the same system without the ablation step. Results show the intensity of the boron peak increases for both boron isotopes at masses 10 and 11, which demonstrates dissolution of the boron carbide sample was readily achieved.

Example 2

Dissolution of Solid Glasses

In another test, glass samples from three SRM 1873 series BaO—ZnO—SiO glasses (e.g., K-458, K-489, and K-963, National Institute for Standards & Technology, Gaithersburg, Md., USA) were introduced into the system of FIG. 1. Glass K-458 is a "blank" glass. Glass K-489 is spiked with elevated levels of tantalum (Ta) and lead (Pb). Glass K-963 is spiked with elevated levels of Europium (Eu), Thorium (Th), and Uranium (U). Each glass was introduced into the LA device, ablated for a period of 40 minutes, and atomized in the ICP. The exhaust from the ICP containing atomized solids was delivered in a carrier gas into an aqueous fluid containing de-ionized water as described in EXAMPLE 1.

Figure 3:
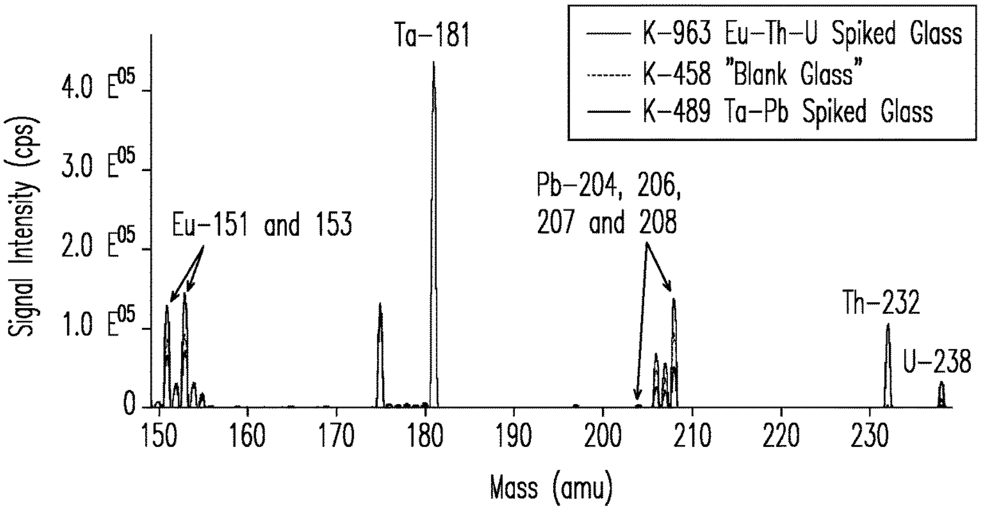
FIG. 3 overlays ICP-MS mass spectra from analyses of solutions containing dissolved solid glasses atomized and dissolved by the present invention.

Three solutions containing the dissolved glass solids were obtained. Each solution was then analyzed by ICP-MS. FIG. 3 shows the mass spectra for each of the three prepared glass solutions overlaid in a single spectrum over a mass range from 149 to 239. In the figure, a blank containing glass K-458 is shown. Glass K-489 containing spiked Ta and Pb is also shown. And, glass K-963 containing spiked Eu, Th, and U is shown. The mass spectrum allows clear identification of the spiked glasses and the blank glass. Results show the U235/238 isotope ratio in the solution prepared from glass K-963 was 0.0722, which is characteristic of natural uranium.

Example 3

Isotopic Ratio Analysis of U-235/U-238 Solids

In another test, a glass wafer of a uranium standard reference material (SRM) containing trace elements of uranium 235 and uranium 238 in a glass matrix (e.g., SRM-610, National Institute of Standards & Technology (NIST), Gaithersburg, Md., USA) at a concentration of about 500 mg/kg (ppm) was introduced into the system of FIG. 1. The sample was ablated by rastering over the surface of the glass wafer for a period of 30 minutes at a laser power of 5 Joules/cm$^2$. Laser beam spot size of 350 μm. Glass particles were swept from the laser ablation cell during ablation using an air-argon flow rate of 0.8 L/min into an inductively coupled (argon) plasma operating at an applied RF frequency of 27.12 MHz and a power of 1000 Watts. A strong orange emission characteristic of the sodium D-line emission from sodium in the glass was visible in the tail flame of the plasma during ablation. The emission disappeared immediately following ablation. Exhaust gas from the plasma was drawn through a glass frit into a 15 mL volume of deionized (18.2 MΩ) water. Exhaust gas was delivered into the deionized water volume at a flow rate sufficient to cause vigorous bubbling of the resulting solution, but sufficiently low to prevent the solution from being drawn into the vacuum pump. The resulting solution was filtered through a 450 nm pore filter (e.g., Acrodisc 0.45 μm filter, Pall Corp., Port Washington, N.Y., USA) and analyzed by a quadrupole ICP-MS to obtain the uranium 235/238 isotope ratio. TABLE 1 lists U235/238 ratios obtained from analysis of the solution containing the dissolved uranium glass standard.

TABLE 1 lists U235/238 ratios obtained from analysis of the solution containing the dissolved NIST uranium glass standard.

| SAMPLE | ANALYSIS RATIO | REPORTED RATIO |
|---|---|---|
| 1 | 2.40E−03 | 2.38E−03 |
| 2 | 2.43E−03 | 2.38E−03 |
| 3 | 2.40E−03 | 2.38E−03 |
| 4 | 2.41E−03 | 2.38E−03 |
| % Relative Standard Deviation (RSD) | 0.825 | |

The isotope ratio reported for the NIST glass standard is 0.00238. Test results show the measured U235/238 ratio of 0.00241 agrees with the expected U235/238 ratio 0.00238, demonstrating that uranium solid from the ablated glass standard is completely dissolved in solution. Natural U235/238 ratio is 0.00726.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the spirit and scope of the invention.

What is claimed is:

1. A pre-analytical sample preparation process using an inductively coupled plasma (ICP) for preparing hard-to-dissolve solids for analysis the process comprising the steps of:

ablating a portion of the solid in an ablation device into particles into a carrier gas;

passing the carrier gas and ablated particles through a plasma to atomize the ablated particles at a temperature selected at or above about 4000 Kelvin; and capturing the atomized particles and the carrier gas in an aqueous solution to form a sample.

2. The process of claim 1, wherein the carrier gas is selected from the group consisting of: argon (Ar), helium (He), nitrogen ($N_2$), oxygen ($O_2$), air, and combinations thereof.

3. The process of claim 1, wherein the sample contains less than about 2% by weight of a concentrated dissolution agent therein.

4. The process of claim 1, wherein capturing the atomized particles and the carrier gas in an aqueous solution to form a sample is performed by delivering the atomized particles and the carrier gas into the aqueous solution through a gas bubbler or frit.

5. A process for performing inductively coupled plasma mass spectroscopy (ICP-MS) analysis of solids comprising the steps of:

pretreating the solid by ablating at least a portion of the solid in an ablation device into particles into a carrier gas;

passing the carrier gas and ablated particles through a plasma to atomize the ablated particles at a temperature selected at or above about 4000 Kelvin to form plasma gas atoms;

capturing the atomized particles and the carrier gas in an aqueous solution to form a sample; and analyzing the sample using an ICP-MS device to determine and quantify components in the original solid.

6. The method of claim 5, wherein the solid is not treated with an acid, alkali or other chemicals.

7. The method of claim 5, wherein the solid contains glass.

8. The method of claim 5, wherein the solid contains boron carbide.

9. The method of claim 5, wherein the solid is a ceramic.

10. The method of claim 5, wherein the solid contains a corrosion-resistant metal containing Zr, or Nb, or Hf, or Ta.

11. A process for performing inductively coupled plasma mass spectroscopy (ICP-MS) analysis of solids, comprising the steps of:

pretreating the solid by ablating at least a portion of the solid in an ablation device into a carrier gas;

passing the carrier gas and ablated particles through the ICP plasma to atomize the ablated particles to form plasma gas atoms;

capturing the exhausted atomized particles and the carrier gas from the ICP in water to form a sampling solution; and analyzing the sampling solution using an ICP-MS device to determine and quantify components in the original solid.

12. The process of claim 11, wherein the step of capturing the exhausted atomized particles and the carrier gas from the ICP is performed by bubbling through a frit.

13. The process of claim 12, wherein the exhaust is captured using a vacuum.

14. The process of claim 11, wherein the solid is not treated with an acid, alkali or other chemicals.

* * * * *